May 15, 1962 D. C. MEAD 3,035,111
DE-ICING INSULATOR
Filed June 7, 1960
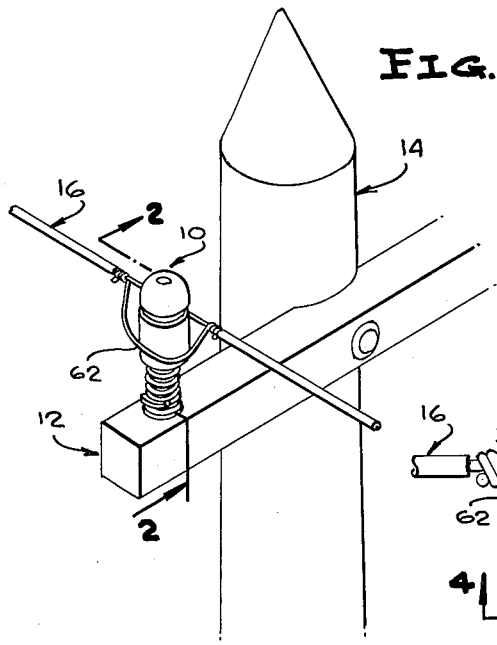
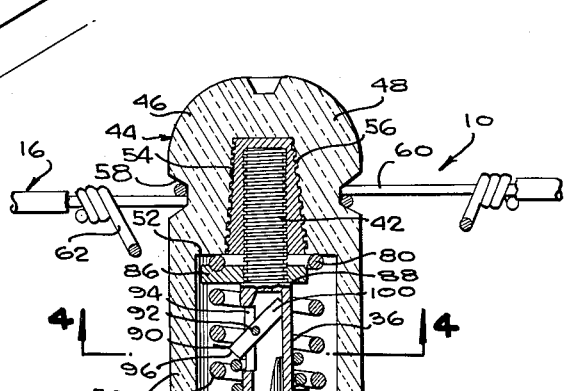
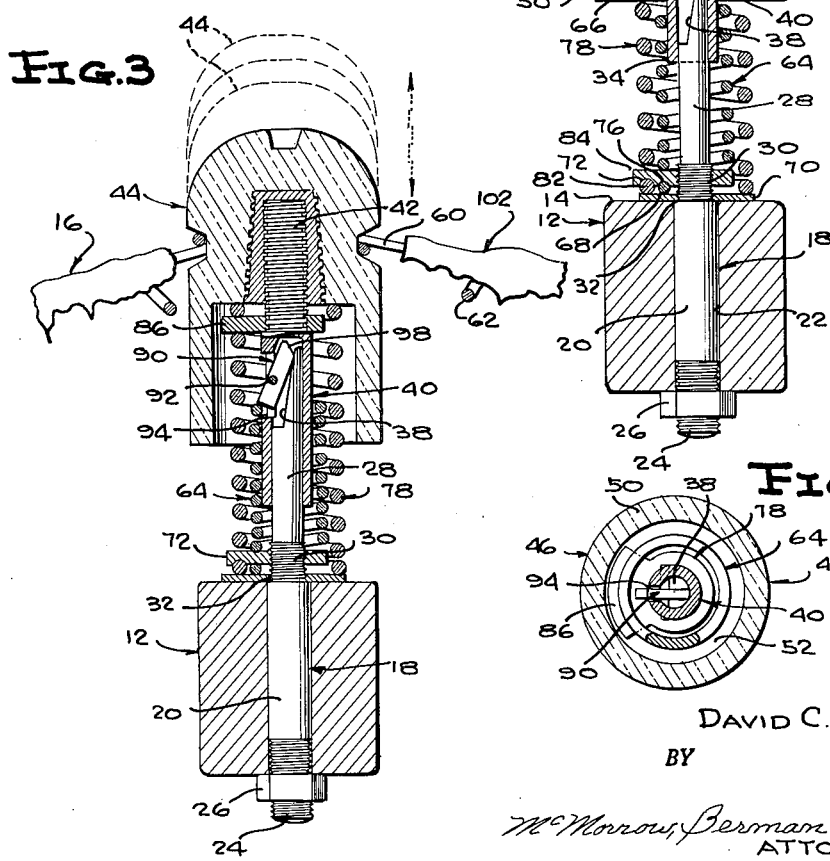
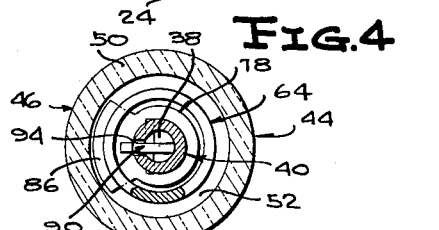
INVENTOR.
DAVID C. MEAD
BY
McMorrow, Berman & Davidson
ATTORNEYS

# United States Patent Office 3,035,111
Patented May 15, 1962

3,035,111
DE-ICING INSULATOR
David C. Mead, Box 266, Rye, Colo.
Filed June 7, 1960, Ser. No. 34,425
8 Claims. (Cl. 174—40)

This invention relates to a novel de-icing insulator for supporting electric lines, on such as outdoor utility poles.

The primary object of the invention is to provide an efficient and reliable combined insulator and de-icer which combines in a single unit the functions of an insulator, and a mechanical de-icer, and which is operative to de-ice a line secured thereto by the increased weight of the line caused by an accumulation of ice or snow thereon, such that the line or the support carrying the device is strained and would otherwise be likely to break or sag and produce an interruption in service.

Another object of the invention is to provide a simple and rugged device of the character indicated above wherein the line is secured to an insulated component, which is mounted on a de-icing component which is fixed to a support, such as a cross arm on a utility pole, the de-icing component having first spring means which is vertically compressible, in response to the weight of an iced line, second spring means which is tensioned by the descent of the first spring means, and trigger or latch means which is released by full descent of the first spring means so that the second spring means snaps forcibly upwardly and shakes the line and flips ice therefrom.

A further object of the invention is to provide a compact, non-bulky device of the character indicated above which occupies a minimum of storage and transportation space, and whose installation, as on a utility pole cross arm, is no more complicated than installing an ordinary line insulator thereon.

Other important objects and advantageous features of the invention will be apparent from the following description and the accompanying drawings, wherein, for purposes of illustration only, a specific form of the invention is set forth in detail.

In the drawings:

FIGURE 1 is a perspective view showing a device installed on a utility pole cross arm and supporting an electric line;

FIGURE 2 is an enlarged vertical transverse section taken on the line 2—2 of FIGURE 1, showing the device in normal vertically expanded condition;

FIGURE 3 is a view similar to FIGURE 2, showing the device compressed by an ice coated line, in full lines, and vertically expanded in phantom lines, and;

FIGURE 4 is a horizontal section taken on the line 4—4 of FIGURE 2.

Referring in detail to the drawings, wherein like numerals designate like parts throughout the several views, the illustrated device, generally designated 10, is shown as being mounted on a cross arm 12 of a utility pole 14, and supporting an electric line 16. It will be understood that the device 10 can be mounted on any other desired and suitable support, such as a building, a utility tower, and the like.

The device 10 comprises an elongated mounting spindle 18 which has a full diameter lower portion 20, adapted to be extended downwardly through a vertical bore 22, provided on the cross arm 12, and having a threaded lower end 24, on which a nut 26 is threaded against the underside of the cross arm. The spindle 18 further comprises a reduced diameter upper portion 28 which has at its lower end, adjacent to the lower portion 24, a threaded portion 30. The threaded portion 30 is slightly smaller in diameter than the lower spindle portion 24, so as to define a stop shoulder 32 at the upper end of the portion 24.

The upper spindle portion 28 is smooth and preferably cylindrical and is formed in one side thereof with a recess which extends upwardly from a midlength point 34 to the upper end 36 of the portion 28, and defines an upwardly and inwardly angled, longitudinally extending cam surface 38. A tubular slide 40, somewhat shorter than the upper spindle portion 28, is slidably circumposed thereon and has fixed on its upper end an upstanding axial threaded stud 42, onto which is threaded an insulator assembly 44.

The insulator assembly 44 preferably comprises an inverted cup-shaped dielectric material body 46 having a solid upper portion 48 of substantial height, and a cylindrical skirt 50 which depends below the bottom 52 of the body 46. A central frusto-conical threaded socket 54 in the body 46 opens to its bottom 52 and has threaded thereon a hollow plug 56, of such as wood, into which the stud 42 is threaded. The body 46 has a circumferential groove 58 extending therearound, in which a stripped portion 60 of the line 16 is wound, in the usual manner, with a slack shunt wire 62 extending around the device and connected to the stripped portion 60 at opposite sides of the device.

Circumposed on the lower part of the tubular slide 40 and extending therebelow is a helical actuator spring 64, having a top convolution 66, and a bottom convolution 68. The bottom convolution 68 is clamped between a washer 70 and a segmental collar 72. The washer 70 is threaded on the threaded portion 30 of the upper portion 28 of the spindle 18 and is engaged with the shoulder 32, and with the top side 74 of the pole cross arm 12. The collar 72 is threaded on the portion 30, above the washer 70, and has in its underside a groove 76 receiving the bottom convolution 68.

A longer and larger diameter load-bearing helical spring 78 spacedly surrounds the actuator spring 64, and is sufficiently stiff to resist being compressed by the weight of the line 16 and of some accumulation of ice on the line, but fully compressible by an abnormal and dangerous accumulation of ice on the line. The load-bearing spring 64 has a top convolution 80 and a bottom convolution 82, the latter being clamped between the washer 70 and the collar 72, in a groove 84 in the collar. The upper convolution 80 is clamped between the bottom 52 of the insulator body 46 and a segmental collar 86 which is threaded down on the stud 42, and permissibly against an annular shoulder 88 on the upper end of the tubular slide 40.

An elongated trigger or latch lever 90 is pivoted, intermediate its ends, on a pivot pin 92 which is fixed in the tubular slide 40 and extends across a vertically elongated slot 94, which is formed in the upper part of the sidewall of the slide, the pin 92 being located between the ends of the slot 94. The lever 90 occupies inwardly and upwardly angled positions, has a squared lower end 96 and an inwardly and downwardly angled upper end 98.

In the normal non-compressed condition of the device, shown in FIGURE 2, the angled upper end 98 of the trigger lever 90 bears conformably against the cam surface 38 at the upper end of the upper spindle portion 28, and the lower end 96 of the lever overlies and can bear upon the top convolution 66 of the actuator spring 64, so that the upper end of the lever 90 is held against the cam surface.

When an excessive accumulation of ice on the line 16 occurs, the combined weight of the line and the ice compress the load-carrying spring 78, and the slide 40 moves downwardly on the upper spindle portion 28, so that the lower end 96 of the trigger lever 90 bears forcibly upon the upper convolution 66 of and compresses the actuator spring 64 so as to tension the same. As the slide 40 moves further downwardly, the cam surface 38 engages the underside of the upper arm 100 of the lever 90 and cams the lever upwardly and outwardly until the lower end 96 of the lever is withdrawn inwardly off the top convolution 66 of the actuator spring 64, so that the actuator spring can expand and snap upwardly against the upper collar 86, thereby in effect striking the bottom 52 of the insulator body 46, and snapping the insulator assembly 44, accompanied by the slide 40, upwardly with sufficient force to flip a coating of ice 102 off the line 16.

The rise of the insulator assembly 44 and the slide 40 to their top positions, produced by the expansion of the actuator spring 64, automatically resets the device for subsequent operation in the manner and for the purpose above described, with the parts positioned as shown in FIGURE 2.

It is to be noted that the skirt 50 of the insulator body 46 spacedly surrounds the upper parts of the springs 64 and 78, the slide 40, the cam surface 38, and the trigger lever 90, and extends downwardly therealong to an extent sufficient to prevent accumulation of ice thereon, under ordinary conditions, so that full operativeness of the mechanism is maintained in icing conditions.

While there has been shown and described herein a preferred form of the invention it is to be understood that the invention is not necessarily confined thereto, and that any change or changes in the structure of and in the relative arrangements of components thereof are contemplated as being within the scope of the invention as defined by the claims appended hereto.

What is claimed is:

1. A combined insulator and de-icer unit comprising a spindle having a lower support-engaging portion and an upper portion, a tubular slide engaged on said upper portion, an insulator assembly fixed on the upper end of said slide, an abutment on the spindle, load-bearing spring means compressed between said abutment and said insulator assembly, normally untensioned actuator spring means fixed at its lower end to the spindle in the region of said abutment, said actuator spring means having a free upper end normally spaced downwardly from said insulator assembly, and trigger means comprising a pivoted trigger lever and a cam surface severally mounted on the upper spindle portion and the slide, the trigger lever normally bearing downwardly on the free upper end of the actuator spring means and said cam surface being operatively engageable with the trigger lever for releasing the lever from the actuator spring means upon descent of the insulator assembly and the slide along the spindle under the weight of an iced line secured to the insulator assembly.

2. A combined insulator and de-icer unit comprising a spindle having a support engaging lower portion and an upper portion, a tubular slide circumposed on said upper portion, an insulator assembly mounted on the upper end of the slide, an abutment fixed on the spindle, a helical load-bearing spring surrounding the slide and said spindle and bearing at related ends against said abutment and the insulator assembly, a helical actuator spring surrounding said slide, said actuator spring having a lower end secured to said abutment and a free upper end, the free upper end of the actuator spring being normally spaced downwardly from the insulator assembly, trigger means mounted on the slide between the upper end of the actuator spring and the insulator assembly and normally bearing upon the upper end of the actuator spring, and cam means on said spindle engageable with the trigger means as the load-bearing spring is compressed downwardly and the slide is moved downwardly relative to the spindle and the actuator spring is compressed, for disengaging the cam means from the upper end of the actuator spring.

3. A combined insulator and de-icer unit comprising a spindle having a support engaging lower portion and an upper portion, a tubular slide circumposed on said upper portion, an insulator assembly mounted on the upper end of the upper spindle portion, an abutment fixed on the spindle below the slide, a helical load-bearing spring surrounding the slide and the spindle and bearing at related ends against said abutment and the insulator assembly, a helical actuator spring surrounding said slide, said actuator spring having a lower end secured to said abutment and a free upper end, the free upper end of the actuator spring being normally spaced downwardly from the insulator assembly, trigger means mounted on the slide between the upper end of the actuator spring and the insulator assembly and normally bearing upon the upper end of the actator spring, and cam means on said spindle engageable with the trigger means as the load-bearing spring is compressed downwardly and the slide is moved downwardly relative to the spindle and the actuator spring is compressed, for disengaging the cam means from the upper end of the actuator spring, said actuator spring being located within the load-bearing spring and circumposed on the slide.

4. A combined insulator and de-icer unit comprising a spindle having a support engaging lower portion and an upper portion, a tubular slide circumposed on said upper portion, an insulator assembly mounted on the upper end of the upper spindle portion, an abutment fixed on the spindle below the slide, a helical load-bearing spring surrounding the slide and the spindle and bearing at related ends against said abutment and the insulator assembly, a helical actuator spring surrounding said slide, said actuator spring having a lower end secured to said abutment and a free upper end, the free upper end of the actuator spring being normally spaced downwardly from the insulator assembly, trigger means mounted on the slide between the upper end of the actuator spring and the insulator assembly and normally bearing upon the upper end of the actuator spring, and cam means on said spindle engageable with the trigger means as the load-bearing spring is compressed downwardly and the slide is moved downwardly relative to the spindle and the actuator spring is compressed, for disengaging the cam means from the upper end of the actuator spring, said trigger means comprising a lever pivoted intermediate its ends on the slide, said lever having a first end to bear upon the upper end of the actuator spring and a second end, said cam means comprising a cam surface on said upper spindle portion to operatively engage the second end of the trigger lever, as the slide moves down along the upper spindle portion.

5. A combined insulator and de-icer unit comprising a spindle having a support engaging lower portion and an upper portion, a tubular slide circumposed on said upper portion, an insulator assembly mounted on the upper end of the upper spindle portion, an abutment fixed on said spindle below the slide, a helical load-bearing spring surrounding the slide and said spindle and bearing at related ends against said abutment and the insulator assembly, a helical actuator spring surrounding said slide, said actuator spring having a lower end secured to said abutment and a free upper end, the free upper end of the actuator spring being normally spaced downwardly from the insulator assembly, trigger means mounted on the slide between the upper end of the actuator spring and the insulator assembly and normally bearing upon the upper end of the actuator spring, and cam means on said spindle engageable with the trigger means as the load-bearing spring is compressed downwardly and the slide is moved downwardly relative to the spindle and the actuator spring is compressed, for disengaging the cam means from the upper end of the actuator spring, said trigger means comprising a lever pivoted intermediate its ends on the slide, said lever having a first end to bear upon the upper end of the actuator spring and a second end, said cam means comprising a cam surface on said upper spindle portion to operatively engage the second end of the trigger lever, as the slide moves down along the upper spindle portion, said second end of the lever having an angled portion thereon to abut the cam surface in the normal elevated position of the slide on said upper spindle portion for holding the first end of the lever engaged with the upper end of the actuator spring.

6. A combined insulator and de-icer unit comprising a spindle having a support engaging lower portion and an upper portion, a tubular slide circumposed on said upper portion, an insulator assembly mounted on the upper end of the upper spindle portion, an abutment fixed on said spindle below the slide, a helical load-bearing spring surrounding the slide and said spindle and bearing at related ends against said abutment and the insulator assembly, a helical actuator spring surrounding said slide, said actuator spring having a lower end secured to said abutment and a free upper end, the free upper end of the actuator spring being normally spaced downwardly from the insulator assembly, trigger means mounted on the slide between the upper end of the actuator spring and the insulator assembly and normally bearing upon the upper end of the actuator spring, and cam means on said spindle engageable with the trigger means as the load-bearing spring is compressed downwardly and the slide is moved downwardly relative to the spindle and the actuator spring is compressed, for disengaging the cam means from the upper end of the actuator spring, said trigger means comprising a lever pivoted intermediate its ends on the slide, said lever having a first end to bear upon the upper end of the actuator spring and a second end, said cam means comprising a cam surface on said upper spindle portion to operatively engage the second end of the trigger lever, as the slide moves down along the upper spindle portion, said second end of the lever having an angled portion thereon to abut the cam surface in the normal elevated position of the slide on said upper spindle portion for holding the first end of the lever engaged with the upper end of the actuator spring, said slide having a vertically elongated slot in the upper part of its sidewall, the lever being pivoted within the slide with its first end working through the slot, and said cam surface being on a related side of the upper spindle portion.

7. A combined insulator and de-icer unit comprising a spindle having a support engaging lower portion and an upper portion, a tubular slide circumposed on said upper portion, an insulator assembly mounted on the upper end of the upper spindle portion, an abutment fixed on said spindle below the slide, a helical load-bearing spring surrounding the slide and said spindle and bearing at related ends against said abutment and the insulator assembly, a helical actuator spring surrounding said slide, said actuator spring having a lower end secured to said abutment and a free upper end, the free upper end of the actuator spring being normally spaced downwardly from the insulator assembly, trigger means mounted on the slide between the upper end of the actuator spring and the insulator assembly and normally bearing upon the upper end of the actuator spring, and cam means on said spindle engageable with the trigger means as the load-bearing spring is compressed downwardly and the slide is moved downwardly relative to the spindle and the actuator spring is compressed, for disengaging the cam means from the upper end of the actuator spring, said trigger means comprising a lever pivoted intermediate its ends on the slide, said lever having a first end to bear upon the upper end of the actuator spring and a second end, said cam means comprising a cam surface on said upper spindle portion to operatively engage the second end of the trigger lever, as the slide moves down along the upper spindle portion, said second end of the lever having an angled portion thereon to abut the cam surface in the normal elevated position of the slide on said upper spindle portion for holding the first end of the lever engated with the upper end of the actuator spring, said slide having a vertically elongated slot in the upper part of its sidewall, the lever being pivoted within the slide with its first end working through the slot, and said cam surface being on a related side of the upper spindle portion, in combination with a utility pole cross arm, said lower spindle portion being extended through the cross arm with said abutment bearing against one side of the cross arm, and a nut threaded on said lower spindle portion and bearing against the opposite side of the cross arm.

8. A combined insulator and de-icer unit comprising a vertical spindle to be mounted on a fixed support, a slide mounted for vertical movement on the spindle, a line carrying insulator mounted on the upper end of the slide, a load-bearing spring normally supporting the slide in elevated position on the spindle and adapted to permit the slide to subside on the spindle when the line secured to the insulator becomes burdened with ice, an actuator spring strong enough to aid the load-bearing spring to snap the slide and the burdened insulator and line upwardly when the actuator spring is compressed to shake ice off the line when released, and latch means on the slide engaged with the actuating spring and operated by descent of the slide for initially compressing and finally releasing the actuating spring.

References Cited in the file of this patent
FOREIGN PATENTS

| | | |
|---|---|---|
| 209,755 | Germany | May 14, 1908 |
| 115,417 | Great Britain | Feb. 13, 1919 |